(12) United States Patent    (10) Patent No.:    US 8,744,994 B2
Chen et al.    (45) Date of Patent:    Jun. 3, 2014

(54) DATA FILTERING AND OPTIMIZATION FOR ETL (EXTRACT, TRANSFORM, LOAD) PROCESSES

(75) Inventors: Ying Chen, San Jose, CA (US); Bin He, San Jose, CA (US); Rui Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 692 days.

(21) Appl. No.: 12/343,021

(22) Filed: Dec. 23, 2008

(65) Prior Publication Data

US 2010/0161576 A1    Jun. 24, 2010

(51) Int. Cl.
*G06F 7/00*    (2006.01)
*G06F 17/30*    (2006.01)

(52) U.S. Cl.
CPC .................. *G06F 17/30563* (2013.01)
USPC ........................................ 707/602

(58) Field of Classification Search
CPC ................................. G06F 17/30563
USPC ........................................ 707/602
See application file for complete search history.

(56) References Cited

U.S. PATENT DOCUMENTS

| | | | |
|---|---|---|---|
| 6,208,990 B1 | 3/2001 | Suresh et al. | |
| 6,795,868 B1 | 9/2004 | Dingman et al. | |
| 7,051,034 B1 * | 5/2006 | Ghosh et al. | 707/718 |
| 7,143,112 B2 | 11/2006 | Yagawa | |
| 7,254,590 B2 | 8/2007 | Mudunuri et al. | |
| 2005/0125436 A1 * | 6/2005 | Mudunuri et al. | 707/102 |
| 2005/0187991 A1 | 8/2005 | Wilms et al. | |
| 2006/0238919 A1 * | 10/2006 | Bradley | 360/128 |
| 2008/0092112 A1 | 4/2008 | Jin et al. | |
| 2008/0222087 A1 * | 9/2008 | Balmin et al. | 707/2 |

OTHER PUBLICATIONS

Carreira, P. et al.; "Data mapper: an operator for expressing one-to-many data transformations"; Data Warehousing and Knowledge Discovery. 7th International Conference, DaWaK 2005. Proceedings (Lecture Notes in Computer Science vol. 3589) p. 136-145, Conference Date: Aug. 22-26, 2005; US.

Shani, U. et al.; "A scalable heterogeneous solution for massive data collection and database loading"; Business Intelligence for the Real-Time Enterprises. First International Workshop, BIRTE 2006. Revised Selected Papers. (Lecture Notes in Computer Science vol. 4365) p. 50-62; Sep. 11, 2006; US.

Lujan-Mora, Sergio et al.; ER 2004 : conceptual modeling : (Shanghai, Nov. 8-12, 2004) International conference on conceptual modeling No. 13, (Aug. 11, 2004) 2004, vol. 3288, pp. 191-204, [Note(s) : XXI, 869 p.,] [Document : 14p.]; Shanghai, China, Data Mapping Diagrams for Data Warehouse Design with UML.

* cited by examiner

*Primary Examiner* — Mariela Reyes
(74) *Attorney, Agent, or Firm* — Shimokaji & Assoc., P.C.

(57) ABSTRACT

A method and system are disclosed for use with an ETL (Extract, Transform, Load) process, comprising optimizing a filter expression to select a subset of data and evaluating the filter expression on the data after the extracting, before the loading, but not during the transforming of the ETL process. The method and system optimizes the filtering using a pipelined evaluation for single predicate filtering and an adaptive optimization for multiple predicate filtering. The adaptive optimization includes an initial phase and a dynamic phase.

20 Claims, 17 Drawing Sheets

A: all text. text not contain word list file "blockList.txt"

B: date.year>2007

C: date.year = = 2007

D: date.month> = 10

E: any author.country = = "US"

F: type.type = = "forum"

G: text.title not empty

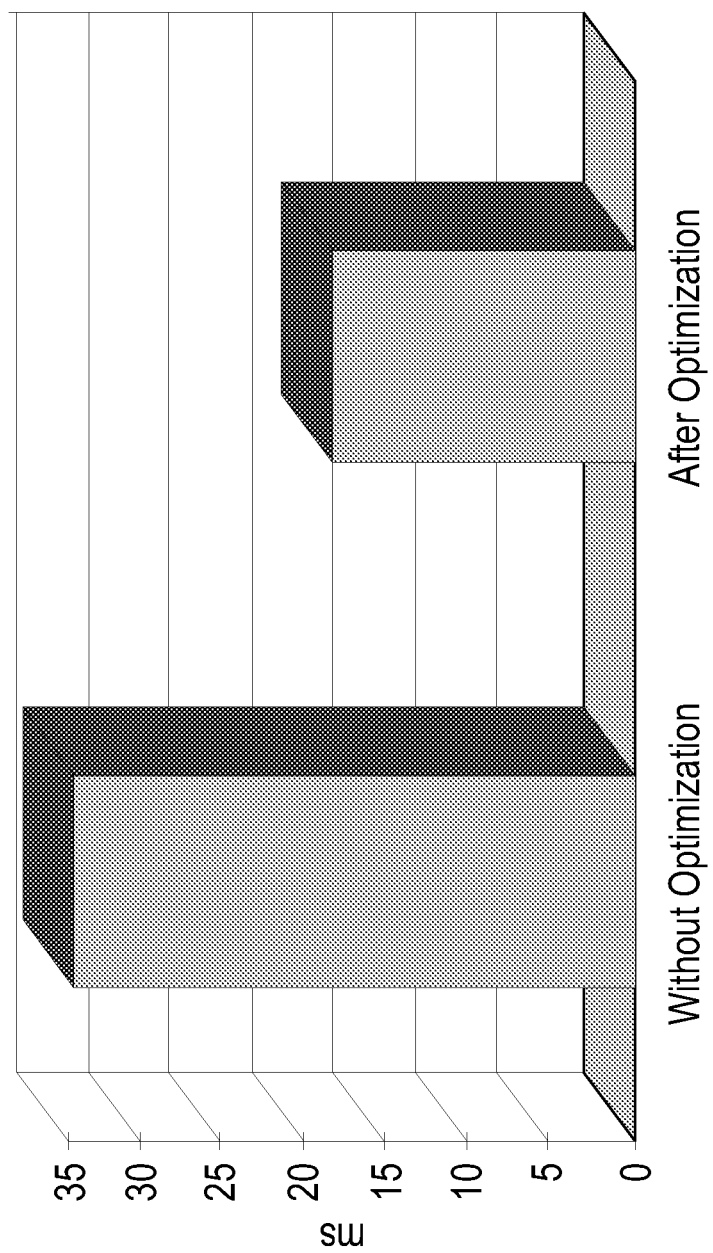

ial data and ETL processes. With the complexity of both data and analytics, users often need to filter out a subset of data in the ETL processes, i.e., only a subset of the data is selected to be loaded according to users' interests. The complexity of the data and the ETL process bring new challenges to the data filtering task, for which it is often necessary to support data filtering in the ETL process.

DATA FILTERING AND OPTIMIZATION FOR ETL (EXTRACT, TRANSFORM, LOAD) PROCESSES

BACKGROUND OF THE INVENTION

The present invention relates generally to the field of information warehouse systems and, more specifically, to data filtering in ETL (Extract, Transform, Load) processes.

Enterprises are building increasingly large information warehouses to enable advanced information analytics and to improve "business values" of information. The data in the warehouses are loaded via ETL (Extract, Transform, Load) processes. Today's information warehouses typically deal with complex data and ETL processes. With the complexity of both data and analytics, users often need to filter out a subset of data in the ETL processes, i.e., only a subset of the data is selected to be loaded according to users' interests. The complexity of the data and the ETL process bring new challenges to the data filtering task, for which it is often necessary to support data filtering in the ETL process.

It is critical to build a general data filtering framework which can be applied in various phases of the ETL process and support various data types and filtering semantics. When there are multiple filters in an ETL process, it can also be important to automatically find an optimal (e.g., a more time-efficient) way to execute the filters.

SUMMARY OF THE INVENTION

In one embodiment of the present invention, a computer-implemented method for use with an ETL (Extract, Transform, Load) process, comprises optimizing a filter expression to select a subset of data; and evaluating the filter expression on the data i) after the extracting, ii) before the loading, and iii) not during the transforming of the ETL process.

In another embodiment of the present invention, an information warehouse system that includes a processor for ETL (Extract, Transform, Load) processing of data executes steps for filtering the data, the data being either extracted data or transformed data, to select a subset of the data; and optimizing the filtering using a pipelined evaluation for single predicate filtering and an adaptive optimization for multiple predicate filtering.

In still another embodiment of the present invention, a computer program product for use with an ETL (Extract, Transform, Load) process comprises a computer useable medium including a computer readable program, wherein the computer readable program when executed on a computer causes the computer to evaluate a filter expression on data after the extracting, before the loading, and not during the transforming of the ETL process in order to select a subset of the data; and optimize the evaluation using a pipelined evaluation for a single predicate filter expression and an adaptive optimization for a multi-predicate filter expression.

These and other features, aspects and advantages of the present invention will become better understood with reference to the following drawings, description and claims.

BRIEF DESCRIPTION OF THE DRAWINGS

FIG. 8 is a bar graph showing relative results for the example of FIGS. 3-7 without optimization and after optimization.

DETAILED DESCRIPTION OF THE INVENTION

Figure 1:
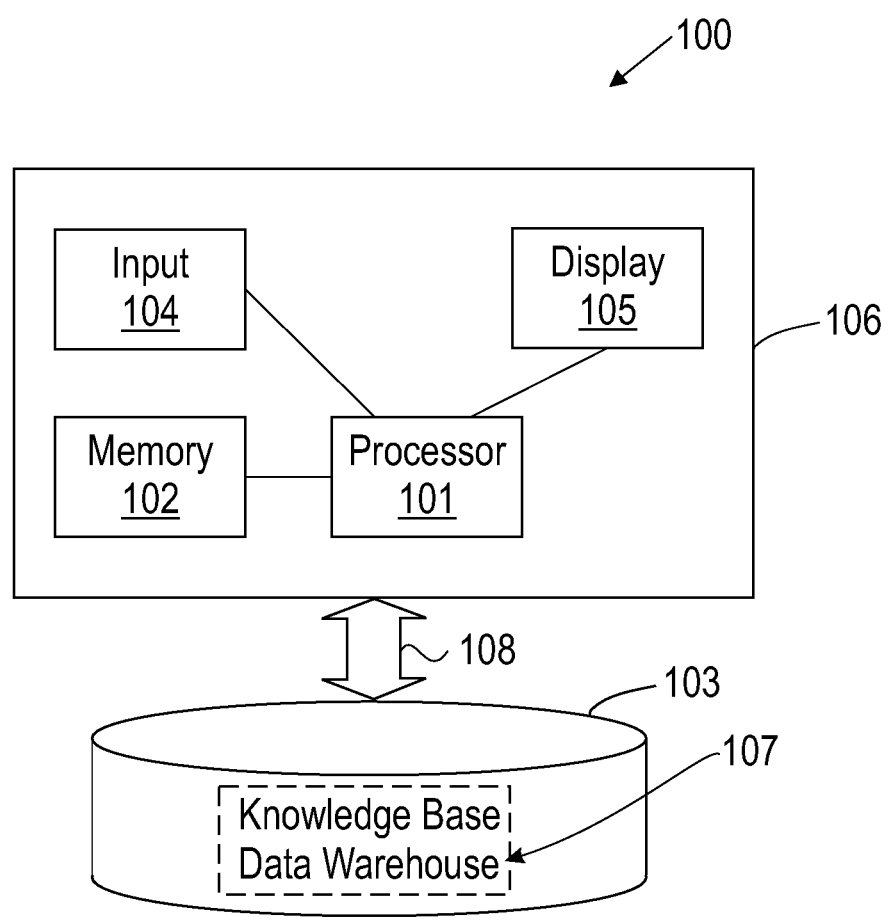
FIG. 1 is a system block diagram illustrating an information warehouse system in accordance with an embodiment of the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

Broadly, the present invention discloses a system and method to perform data filtering in ETL (Extract, Transform, Load) processes used with information warehouse systems. Embodiments may support adding filtering (i.e., selecting a subset of the data according to some pre-determined criteria) in two ETL stages: filtering on extracted data, and filtering on transformed data. Embodiments may also support filter operations on both structured data and unstructured data. A filter expression can be expressed using either a raw data path or a warehouse path. Embodiments may also include techniques to cope with filter optimizations, such as: 1) pipelined expression evaluation for expressions on XML (extended markup language) data; and 2) an adaptive algorithm to dynamically find the optimal execution plan for given filters and data sets. An example shows that the optimization using embodiments can effectively improve the filtering performance.

In computing, optimization may be described as a process of modifying a system to make some aspect of it work more efficiently or use fewer resources. For example, a computer program may be optimized so that it executes more rapidly, or is capable of operating with less memory storage or other resources, or draw less power. Although the word "optimization" shares the same root as "optimal," it is rare for the process of optimization to produce a completely optimal system. The optimized system will typically only be optimal in one application or for one use. For example, one might reduce the amount of time that a program takes to perform some task at the price of making it consume more memory. In an application where memory space is at a premium, one might deliberately choose a slower algorithm in order to use less memory. The effort required to make a system completely optimal—incapable of any further improvement—is generally more than is reasonable for the benefits that would be accrued; so the process of optimization may be halted before a completely optimal solution has been reached.

Embodiments may apply data filtering in many different ETL situations, for example: 1) some filters may be put on extracted data, others on transformed data; 2) some filters may be put on data paths referring to the raw data, others on paths referring to the warehouse dimensions and attributes; 3) some filters may deal with structured data, others with unstructured data; and 4) some filters may deal with single-value predicates, others with set-value predicates. Embodiments of the present invention can provide a data filtering framework that can support all these situations in a coherent way.

In many cases, data filtering operations can be complicated and time-consuming. so that a data filter in the ETL process can be expensive to execute. For example: 1) a filter expression may involve an XPath to the raw data, the XPath referring to a set of values, and extracting all the values out can be an expensive operation if there are many matching values; 2) a filter expression may involve transformation functions that are expensive to execute (e.g, annotators, stemmers) so that the filter expressions including those functions are also expensive to execute; and 3) a filter expression may involve predicates that are expensive to execute (e.g., the stop word list predicate for unstructured data). Therefore, embodiments of the present invention, in contrast to the prior art, optimize the data filtering operations in an ETL process so as to address these issues.

Addressing the first issue, embodiments may employ a pipelined expression evaluation strategy, where, in contrast to prior art, values matched by an XPath are extracted and evaluated in a pipelined matter. Also in contrast to the prior art, embodiments exploit the fact that in many cases, the filter process need not extract all the values to gain the evaluation result of the filter expression.

Addressing the second and third issues, embodiments may employ an adaptive optimization algorithm for filter expressions. Given any filter expressions and input data, this adaptive optimization algorithm can, in contrast to the prior art, automatically find the optimal execution ordering of the filter expressions and dynamically adjust to the change of data. This adaptive optimization algorithm can significantly reduce the execution time on data filtering in contrast to non-optimized filtering. The adaptive optimization algorithm differs from the prior art in that filter expressions can be optimized regardless of the ordering in which users write them.

FIG. 1 illustrates information warehouse system 100 in accordance with one embodiment of the present invention. Information warehouse system 100 may comprise a computer system 106 that may include a computer processor 101, which may have a memory 102 and which may provide a means of input 104—such as a keyboard and mouse—and display 105—such as a printer or monitor—for a user of information warehouse system 100. Information warehouse system 100 may provide a user access to and ability to perform database operations on information available from a knowledge base data warehouse 107. For example, computer system 106 may provide an interface for a human user to access data warehouse 107. The data warehouse 107 may be implemented using computer-readable storage devices 103. Computer-readable storage devices 103 may communicate with computer system 106 via a network, electronic, or other communication path 108. Data warehouse 107 may contain documents that include, for example, business intelligence databases as well as other kinds of information that are helpful in analysis.

Figure 2:
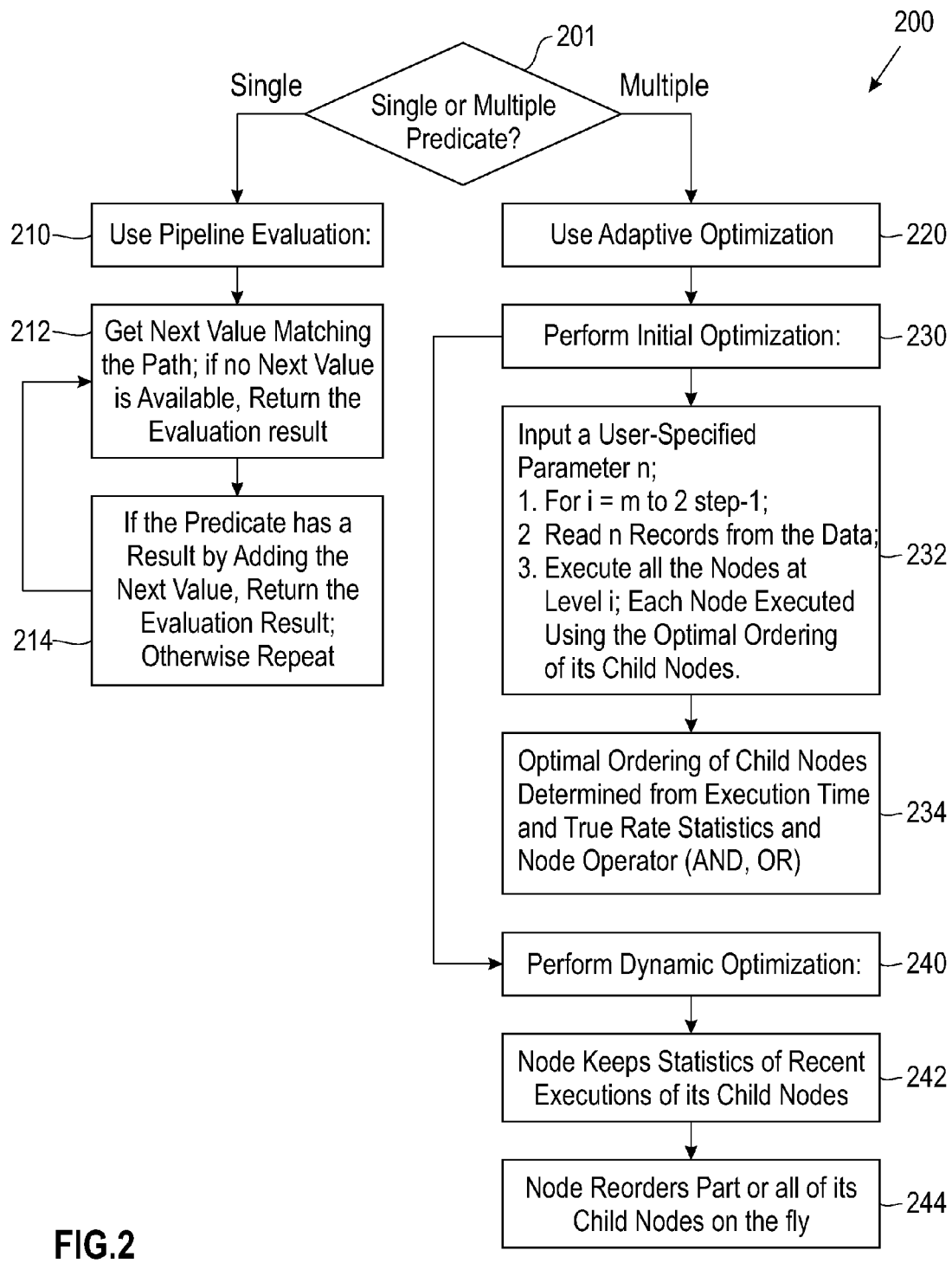
FIG. 2 is a flowchart illustrating a method for data filtering in ETL processes in accordance with an embodiment of the present invention.

FIG. 2 illustrates a method 200, according to an embodiment of the present invention, for optimizing data filtering for an ETL process. Understanding a description of FIG. 2 may be aided by the following preliminary definitions and examples.

A filter expression may be a Boolean expression of a set of filter predicates. For example, filter predicates may be connected with Boolean operators such as && ("and") and || ("or"). A filter predicate may consist of four components: the quantifier, the attribute path, the operator, and the value (or another attribute path).

There may be two types of attribute paths: raw data path and dimension path. A raw data path may be a data path referring to values in the raw data. A dimension path may be a path referring to values in a dimension attribute. An example for a data path predicate is:

"./date/year/text( )">=2006.

An example for a dimension path predicate, where "date" is the dimension name in the warehouse, and "year" is the attribute name is:

date.year>=2006.

Each type of path may be useful for some situations. For instance, there can be multiple data formats loaded into one warehouse so that each data format has its own schema and, thus, needs a set of matchings. If only data path predicates were used, then for each data format, a specific filter would have to be written. Using dimension path predicates can obviate such need. In some cases, however, data path predicates are unavoidable. For instance, such a case arises if the filter predicate is on an attribute that does not correspond to any dimension attributes. Thus, embodiments support both types of paths.

Because a path may refer to a set of values as well as a single value, quantifiers can be used to support set level predicates. A quantifier can be "all", "any", "num[+/−], or "percentage %[+/−]". By default, the "all" quantifier is used if no quantifier is specified. Therefore, by definition "./date/year/text( )">=2006 is equal to all "./date/year/text( )">=2006.

The predicates above may select documents for which all the years are after 2006, i.e., 2006 or later. The predicate below may select documents for which at least one year is later than 2006:

any"./date/year/text( )">=2006.

The predicate below may select documents with two or more years later than 2006:

2+"./date/year/text( )">=2006.

The predicate below may select documents with 50% or less years after 2006:

50%-"./date/year/text( )">=2006.

Embodiments may also provide support for predicates for unstructured data, for example, the CONTAIN predicate. The simplest format is CONTAIN+a value:

text.text contain word "warehouse".

Further, a list of words can be put into a stop word list file (or selected word list file), for example:

text.text not contain word list file "block.txt".

Data filters can be used on extracted data, or transformed data, i.e., after the extract stage of an ETL process or before the load stage of an ETL process but not during the transform stage. An example of data filters on extracted data is:

"./date/year/text( )">=2006 && "./authors/author/country/text( )"=="US".

An example of data filters on transformed data is:

GetIntMonth("./date/month/text( )">=10 && all

Tokenize("./authors/author/country/text( )") not contain word list file

"/home/blockWordList").

Filter syntax can be simplified. For example, two predicates may only be different in their paths. In such a case, a Boolean combination of the two predicates can be written in a more concise way. For instance, the filter expression text.title not contain word list file "block.txt" && text.text not contain word list file "block.txt"

can be combined as fields text.title, text.text not contain word list file "block.txt".

Method 200 may provide optimization for filters in the ETL process, since extraction, transformation and the filter operation can all be expensive processes. For instance, the filter expression:

fields Tokenize(text.title), Tokenize(text.text) not contain word list file "block.txt"

may be very slow because in the expression, the title and text fields need to be extracted and tokenized. Then each word or a series of words need to be tested to determine whether they appeared in the word list or not.

The optimization used by method 200 exploits two observations: 1) for single-predicate optimization, a predicate can be evaluated in a pipelined way; and 2) for multi-predicate optimization, the execution ordering of filter predicates can make a significant difference, because not all parts of the AND (respectively OR) clause need to be executed if any part of the clause returned false (respectively true).

Thus, at step 201, method 200 may determine whether the filter expression is a single predicate or multi-predicate filter. In case of a single predicate optimization, method 200 may use a pipelined evaluation (step 210).

By way of contrast to the pipelined evaluation of method 200, a batch evaluation, if a data path matches a set of values, will first extract all the values and then evaluate the predicate. If there are too many values to extract, the extraction step may take a relatively long time. It is often unnecessary, however, to extract all the values to evaluate the predicate. For instance, the predicate any"./date/year/text( )">=2006 is true as long as one year value is no less than 2006. The predicate all"./date/year/text( )">=2006 is false as long as one year value is less than 2006. Therefore, instead of doing batch evaluation, method 200 employs a pipelined evaluation (steps 210, 212, 214) for evaluating a filter predicate. The pipelined evaluation may be described as follows:

1) Get next value matching the path. If no next value is available, return the evaluation result (step 212).
2) If the predicate has a result by adding this new (next) value, return the result (step 214).
3) Otherwise, go to 1), i.e., repeat the process by returning to step 212.

This pipelined evaluation can significantly improve the evaluation for a single predicate, especially when the path has many matching values.

In the case of method 200 having determined the filter expression is a multi-predicate filter at step 201, method 200 may use an adaptive optimization in evaluating the filter expression (step 220). The adaptive optimization process (step 220) may have two parts: 1) initial optimization (steps 230, 232, 234) to find the initial optimal execution plan in the initial loading of data; and 2) dynamic optimization (steps 240, 242, 244) to dynamically adjust the execution plan according to recent evaluation statistics during the loading.

The adaptive optimization process (step 220) may begin with an initial optimization 230 and then adjust the process using dynamic optimization 240 because the performance of filters may depend not only on the filter operations but also on the data. For example, the expression text.title contain "thinkpad" or text.title contain "Eee PC"

may be evaluated with either of two execution plans: 1) execute text.title contain "thinkpad" first and then text.title contain "Eee PC" or 2) execute text.title contain "Eee PC" first and then text.title contain "thinkpad". Plan 1 can execute faster than plan 2 if the raw data contains more "thinkpad" than "Eee PC" in data, but plan 2 can execute faster if there are more "Eee PC" than "thinkpad" in the data.

The initial optimization (step 230) may be described as a bottom up optimization. That is, for an expression tree (see, e.g., FIG. 4) with m levels, method 200 may first optimize the nodes in the lowest level, i.e. level m, and then optimize the level m−1, and so on. The initial optimization (step 232) may be described as:

Input a user specified parameter n;
for index i=m to 2 step−1;
read n records from the data;
execute all the nodes at level i. Each node is executed using the optimal ordering of its child nodes.

It may be noted that the bottom level, level m, has no child nodes. Thus, for the first iteration of the for loop, nodes at level i=m may simply be executed without regard to ordering of child nodes.

The optimal ordering of child nodes (step 234) may be based on values—for example, average execution time (denoted by "t") and true rate (denoted by "c")—that are computed for each node in the expression tree. True rate may be defined as the percentage (from 0 to 100%) of data for which the node evaluates to "true" and may be expressed as a fraction between 0.0 and 1.0. The optimal ordering of child nodes may be calculated according to whether a node is an OR node or an AND node.

If a node is an OR node, its child nodes may be ordered by $(1+c_i)/(1+t_i)$, where $t_i$ and $c_i$ are the average execution time and true rate, respectively, for the ith child node. According to this ordering, a node with higher true rate and lower execution time may be executed first. Such an ordering may be expected to execute more quickly than other orderings because, as noted above, not all parts of an OR clause need to be executed if any part of the clause returns true.

Similarly, if a node is an AND node, its child nodes may be ordered by $(2-c_i)/(1+t_i)$.

That is, according to this ordering, a node with higher false rate and lower execution time may be executed first.

At least one initial optimization (230) may need to be executed to make the entire adaptive optimization (steps 220, 230, 240) start rolling. But the initial optimization (230) can also be executed at the beginning of each raw data file, or after every n records, to make sure the adaptive optimization (220) is optimal to the current raw data.

Once an initial optimization (230) has been performed, method 200 may continue with a dynamic optimization (240). One feature of the initial optimization (230) is that the ordering of nodes (234) can be efficiently computed and the decision of the optimal plan can be made on the fly. For example, each node may keep the statistics of the recent executions of its child nodes (step 242). Some of a node's child nodes may have been executed for a reasonable enough count to provide a reliable statistic. Thus, it is possible for a node to reorder part or all of its child nodes on the fly (step 244). One issue that needs to be taken care of is how to update recent execution statistics, such as the average execution times and true rates for nodes in the expression tree. The problem then becomes how to keep the most recent k evaluations. If k is a small enough value for the statistics of all the most recent k evaluations to fit in memory—e.g., memory 102 of information warehouse system 100—method 200 can keep all of the recent k values in memory (e.g., memory 102). If k is too large for all the statistics to fit, e.g., in memory 102, method 200 may need to split the data into m buckets, where each bucket may hold the statistics of (k/m) records except that the last bucket may hold 0 to (k/m) records, where (k/m) may be taken to mean the least integer greater than or equal to k/m or some reasonable approximation to the value of k/m.

EXAMPLE

Figure 3:
FIG. 3 is a set of graphs of evaluation result and execution time by record—one graph for each Boolean clause of a Boolean expression applied to simplified example data records—illustrating an example of data filtering in accordance with an embodiment of the present invention.
Figure 3:
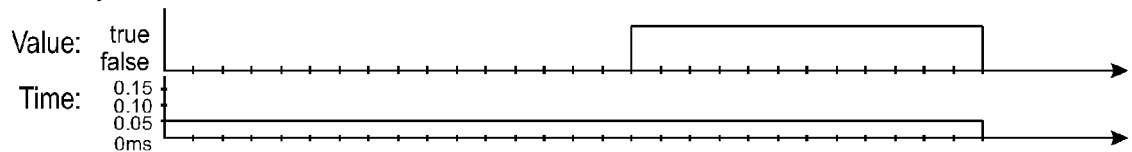
Figure 3:
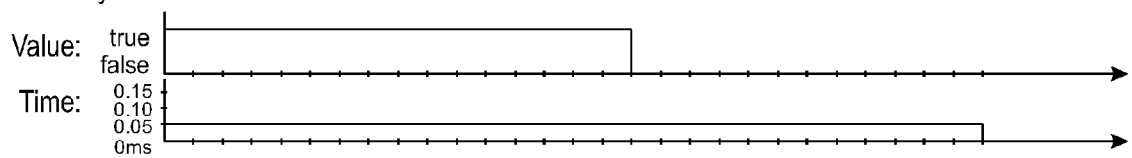
Figure 3:
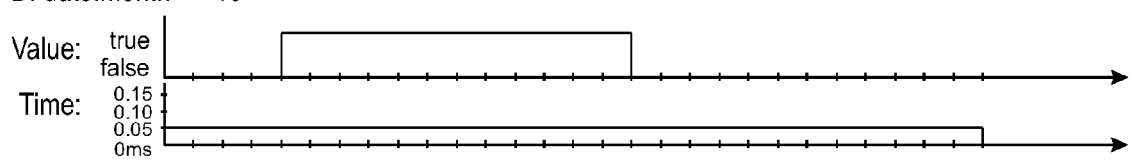
Figure 3:
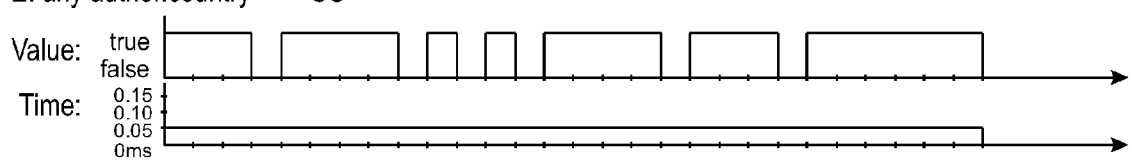
Figure 3:
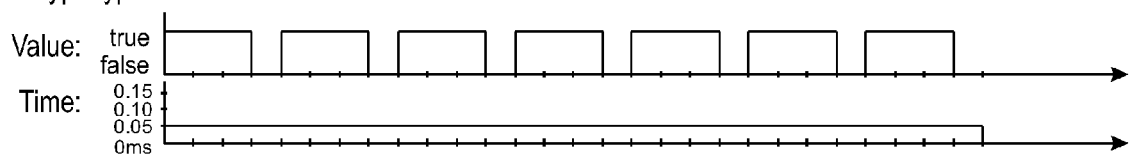
Figure 3:
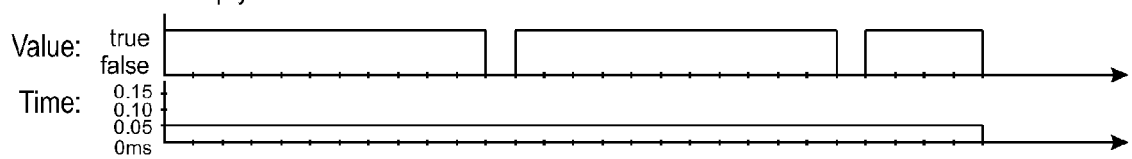

An example to illustrate application of method 200 uses the following Boolean expression for filtering data:

(all text.text not contain word list file "blockList.txt"
&& (date.year>2007|| (date.year==2007 &&
date.month>=10)) && any
author.country=="US" && type.type=="forum"
&& text.title not empty)

to filter 28 records. The result and execute time of each Boolean clause of the above filter expression for each record is shown in FIG. 3, where each clause (i.e., predicate) has been given a label from A through G; the 28 records are shown along the horizontal axis for each clause; and the true/false value and execution time are shown along two separate vertical axes for each clause. In FIG. 3, the result of each Boolean clause can be either true or false. The execute time of each Boolean clause may be measured in milliseconds as shown in FIG. 3. In the example Boolean expression, the most time consuming operation, filtering words from the blocked list by executing clause A, may need about 1.5 milliseconds as shown for clause A, while other operations may all be simpler and only need 0.05 milliseconds as shown for clauses B, C, D, E, F, and G.

Figure 4:
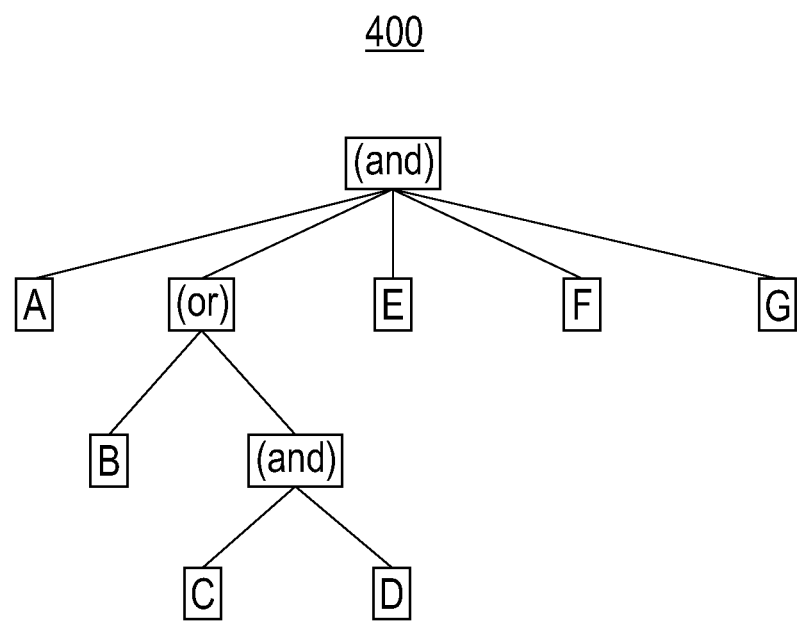
FIG. 4 is a Boolean tree illustrating the Boolean expression of FIG. 3.

FIG. 4 shows the initial Boolean tree 400 corresponding to the example Boolean filter expression. As in FIG. 3, each clause has its same label from A through G, and the Boolean tree 400 can be represented as shown in FIG. 4. If the initial Boolean tree 400 is used for data filtering, the total time used to filter the 28 records may be 138 milliseconds (ms). The first 6 records may need 9.6 ms, and the other 22 records may need 34.55 ms. For this example, the first 6 records are separated to use them to collect statistical information in a first run without optimization and then optimize the Boolean tree in the next run. The statistical information for the Boolean tree without optimization is shown in FIG. 5A after record 5 (the sixth record) has been processed and is shown in FIG. 5B after record 27 (the last record) has been processed.

Figure 5A:
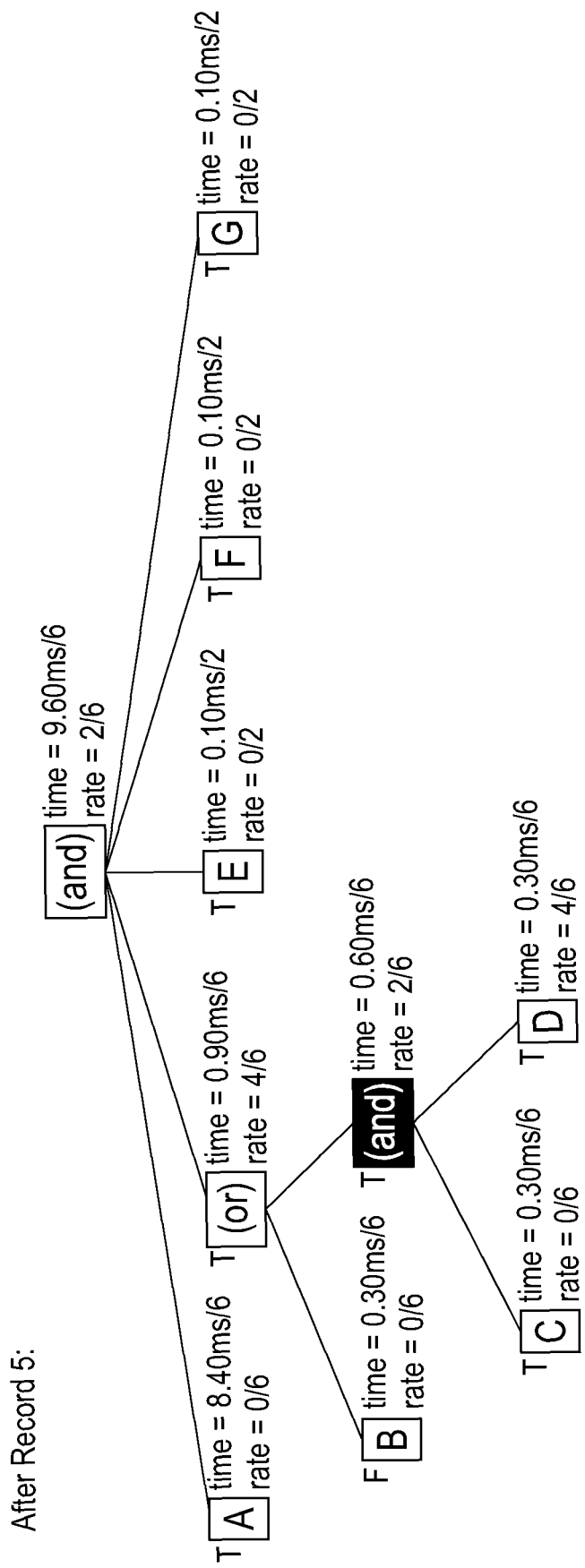
FIGS. 5A and 5B are Boolean trees for the Boolean expression of FIG. 3 summarizing the results of executing data filtering after data record 5 (FIG. 5A) and after data record 27 (FIG. 5B)
Figure 5B:
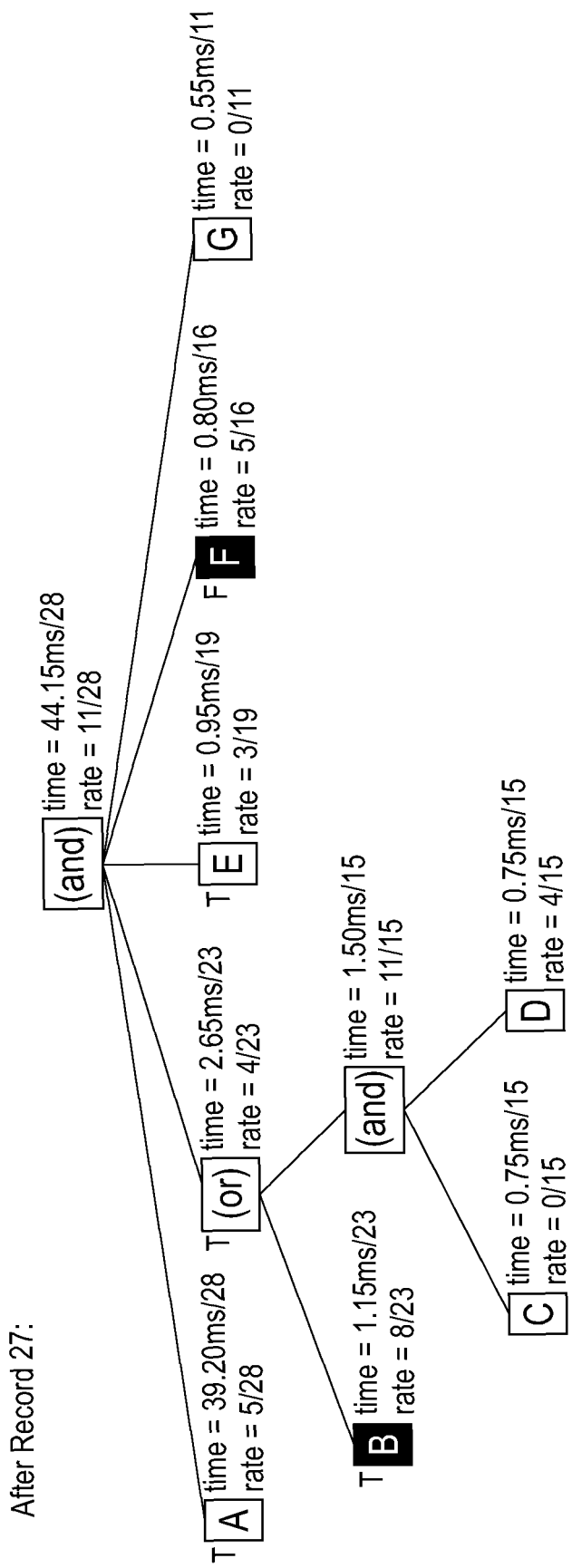

In FIGS. 5A and 5B, the character on the left side of each Boolean tree node represents the result of the node in the last execution, "T" means true and "F" means false. If the tree node is black, it means it returned a significant result which can cause its parent node to stop execution. The numbers on the right side of each tree node are the average execution times and true rates, represented in the "total divide count" format, i.e., the total of execution time or true counts divided by the number of records executed.

To make the optimization stable, the expression tree may be optimized from the bottom up. In this example, two records may be used for each tree level, which means records 0 and 1 may be used to optimize the third level of the tree (nodes C and D), records 2 and 3 may be used to optimize the second level of the tree (nodes B and the (and) of C and D), and records 4 and 5 may be used to optimize the first level of the tree (nodes A, (or), E, F, and G). For each tree node, three values may be collected: total execute count, total successful (i.e., true) count and total time. Method 200 may give each node a ranking score base on these values for optimization:

$$Score_i = \frac{1+c_i}{1+t_i}$$

where $Score_i$ is the ranking score for a tree node, $c_i$ is the total successful execute count for a tree node and $t_i$ is the total execute time for a tree node.

Figure 6A:
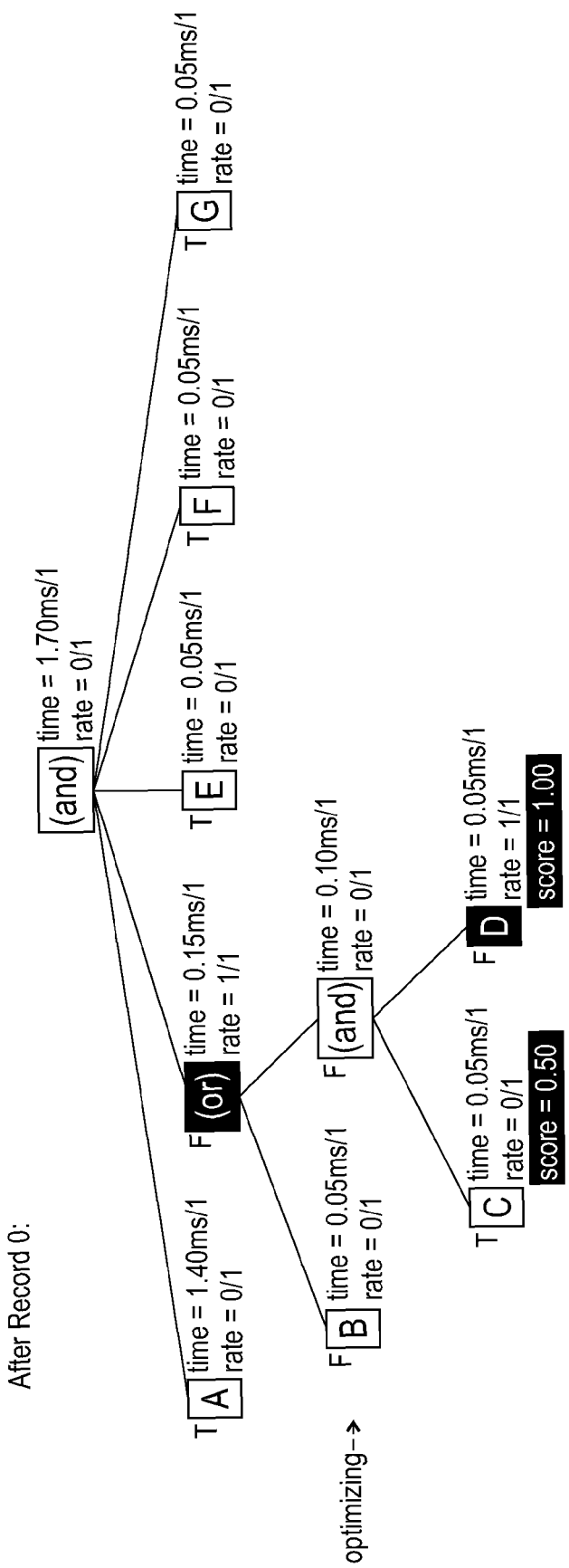
FIGS. 6A through 6I are Boolean trees for the Boolean expression of FIG. 3 summarizing the results of executing data filtering after each of data records 0-5 and the results of optimization.
Figure 6B:
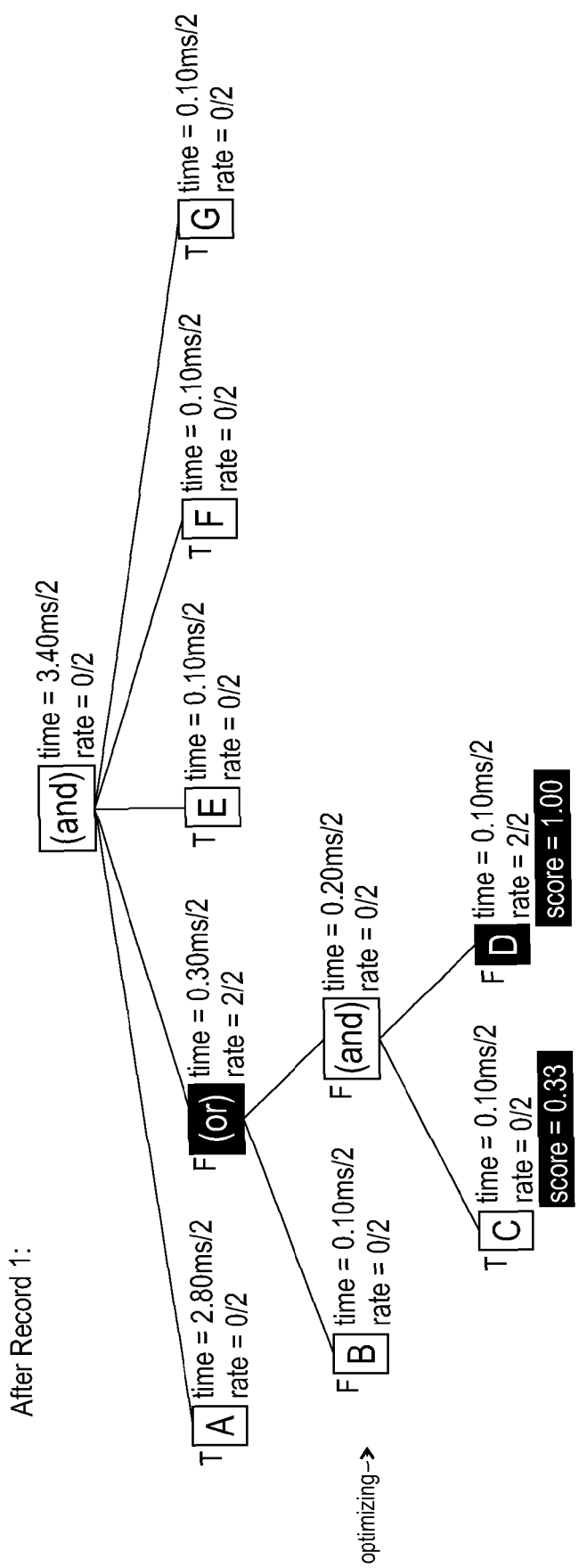
Figure 6C:
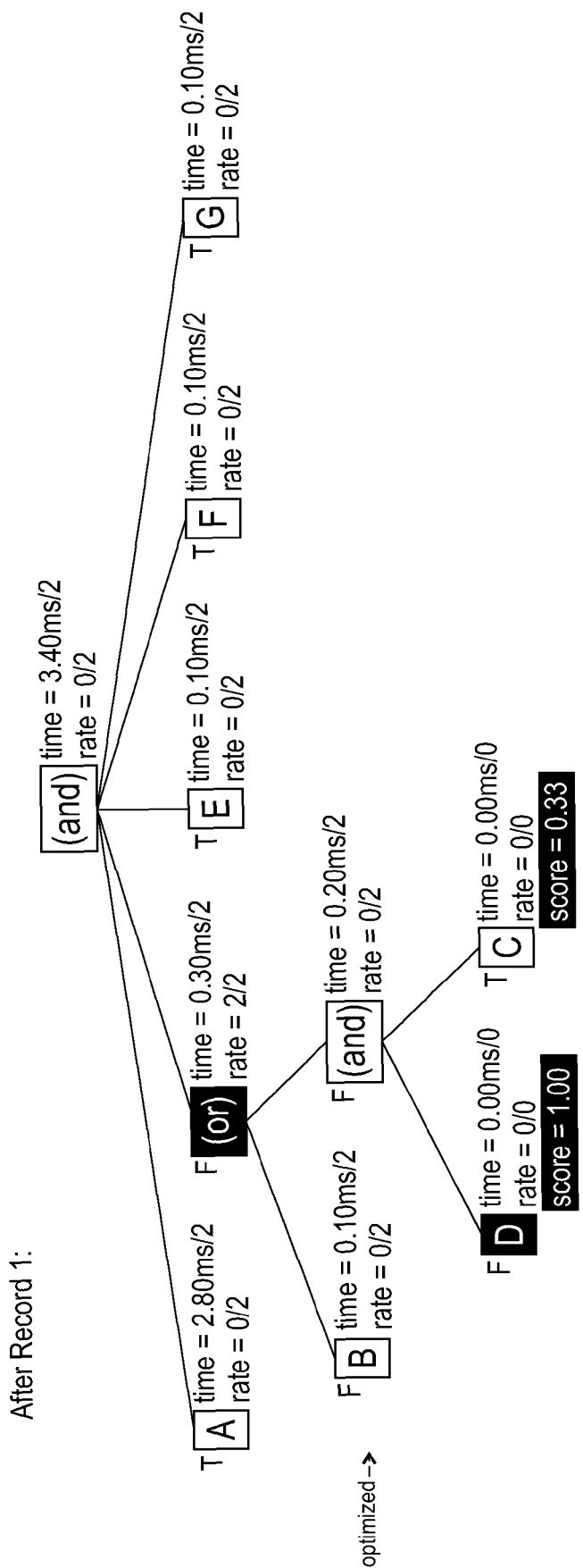
Figure 6D:
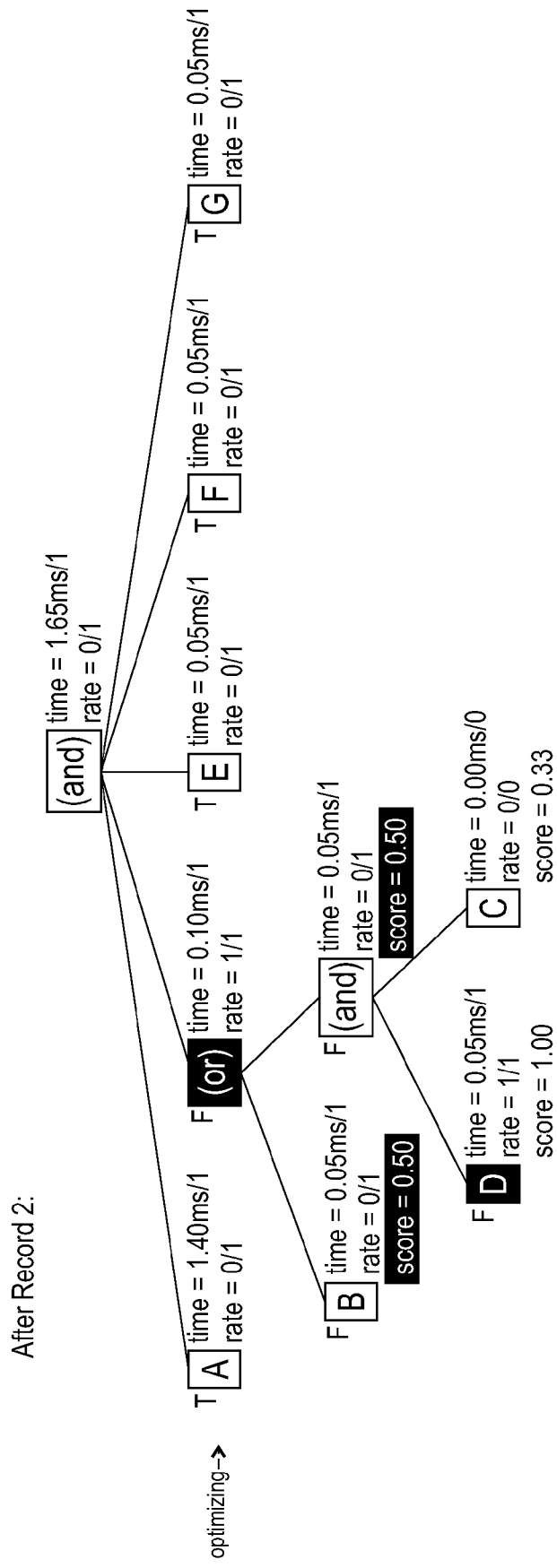
Figure 6E:
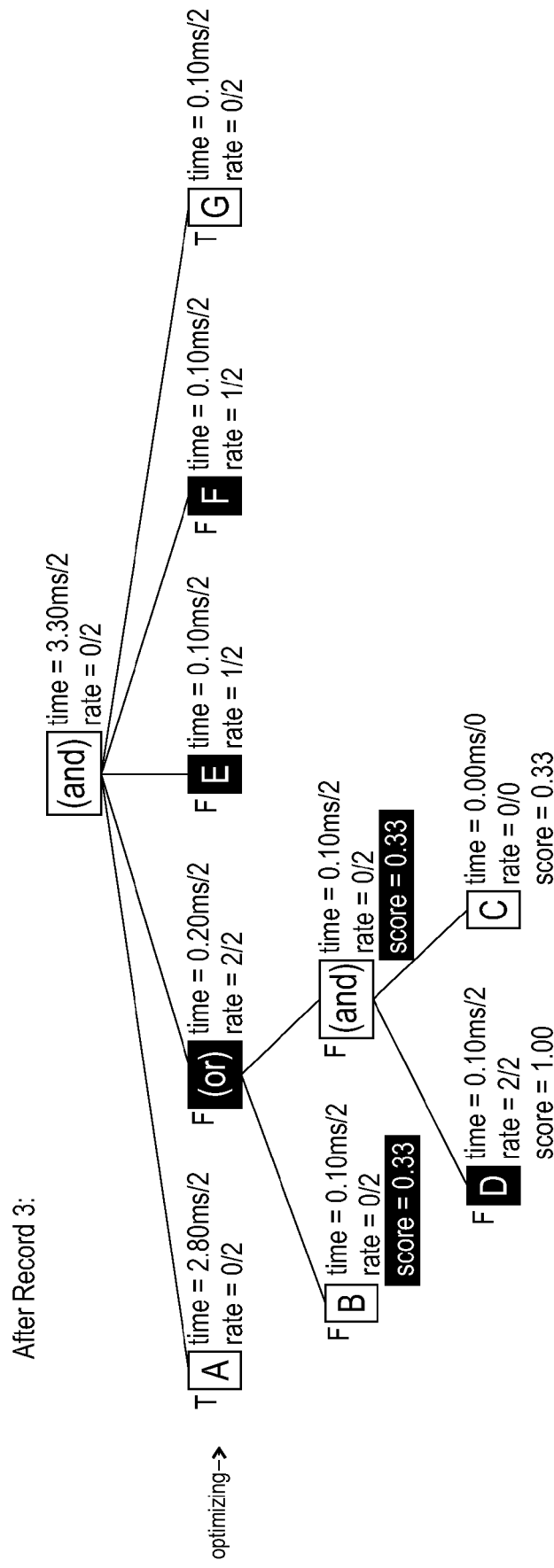
Figure 6F:
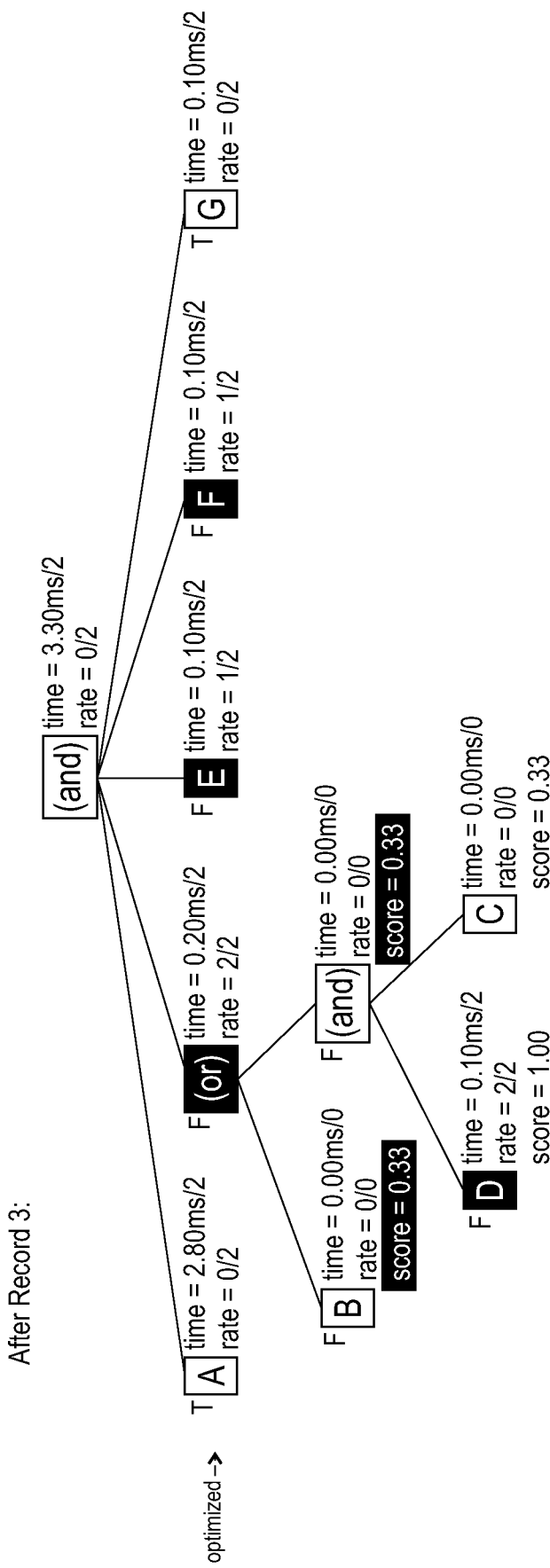
Figure 6G:
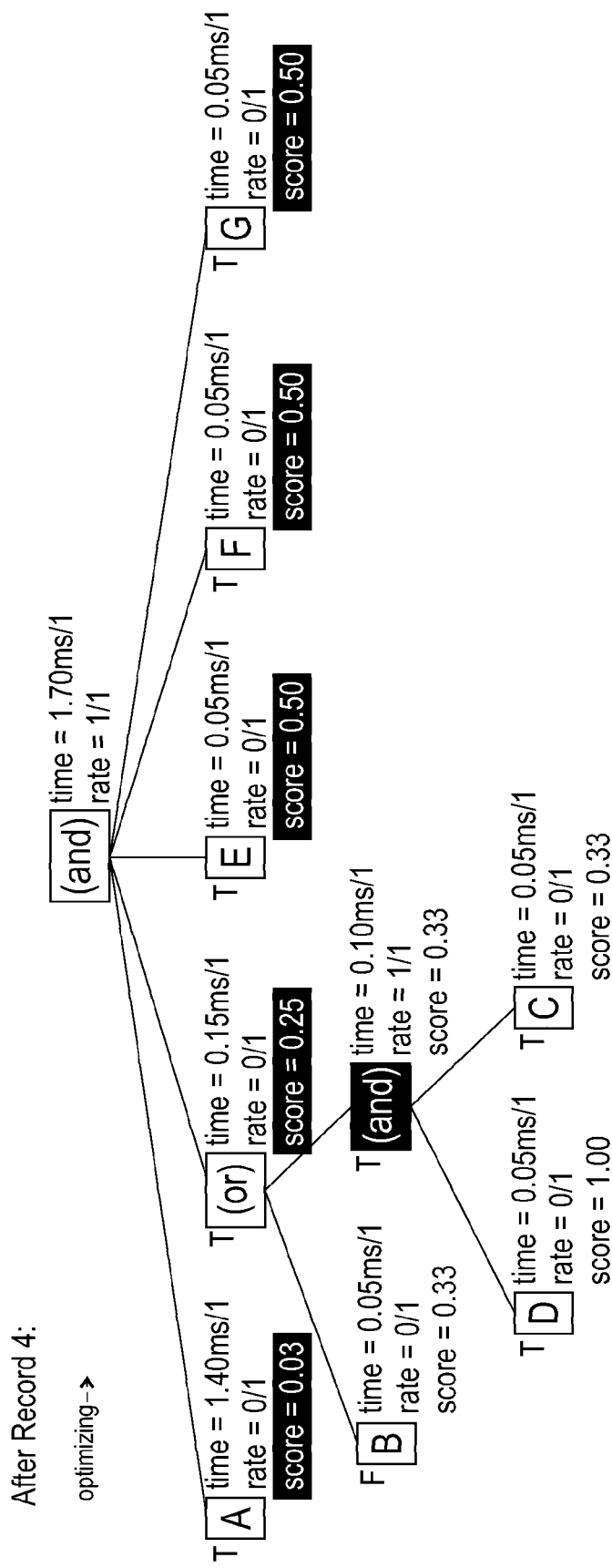
Figure 6H:
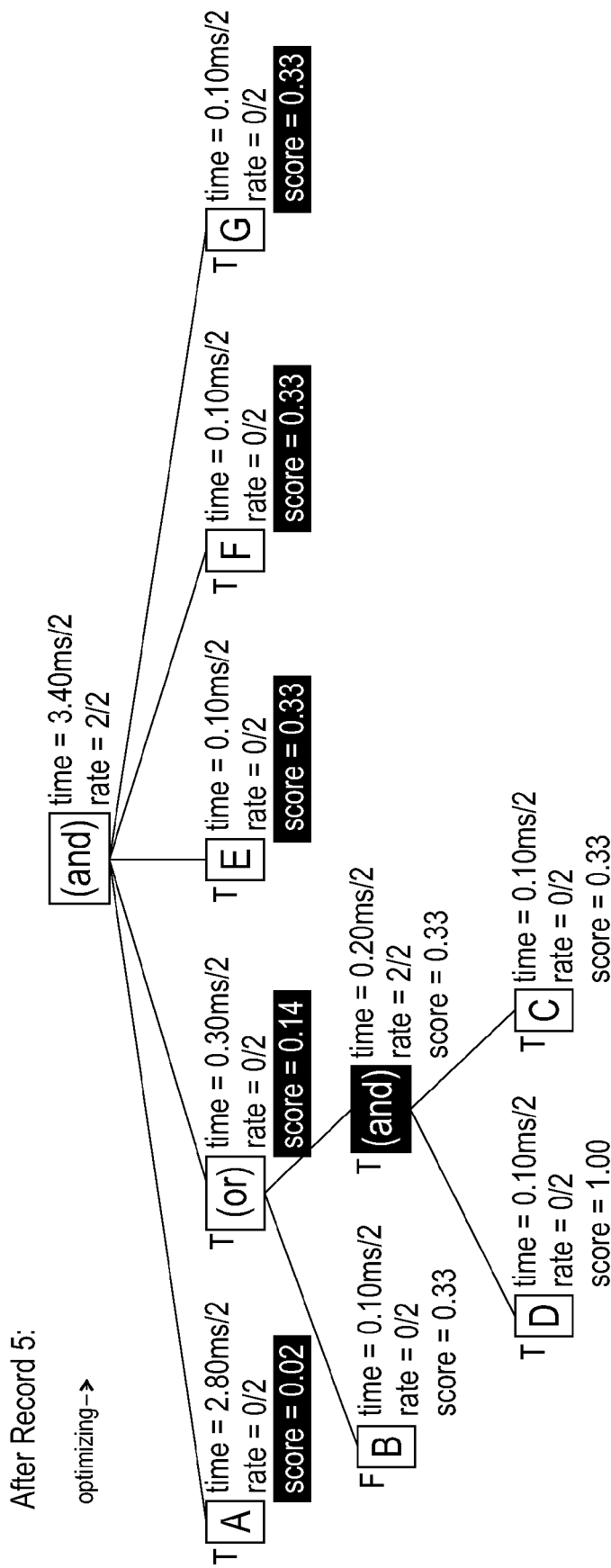
Figure 6I:
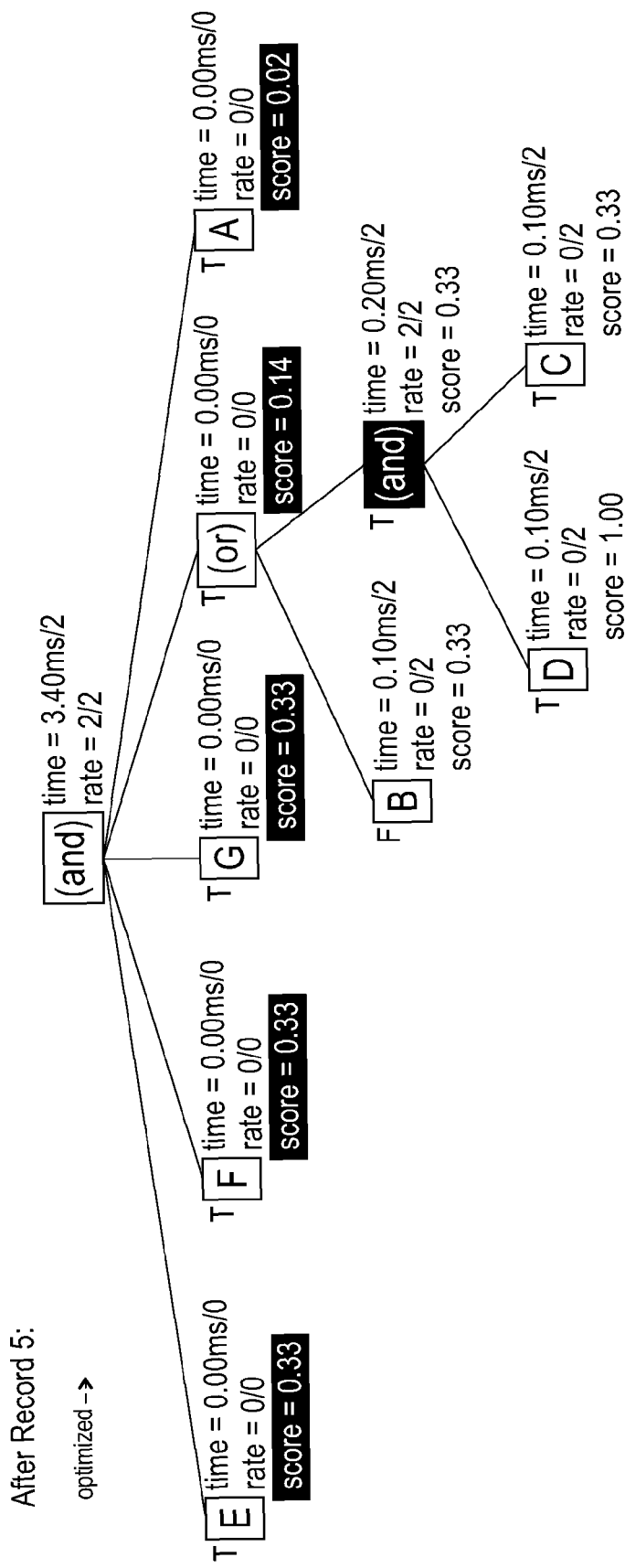

The step by step optimization details for the first 6 records are shown in FIGS. 6A through 6I, summarizing the results of executing the data filtering after each of data records 0 through 5 and showing the results of optimization. For example, FIG. 6B shows the results after processing record 1 before optimization and FIG. 6C shows the results after processing record 1 after optimization; FIG. 6D goes on to show the results after processing record 2, and so on through record 5 after optimization shown in FIG. 6I.

Figure 7:
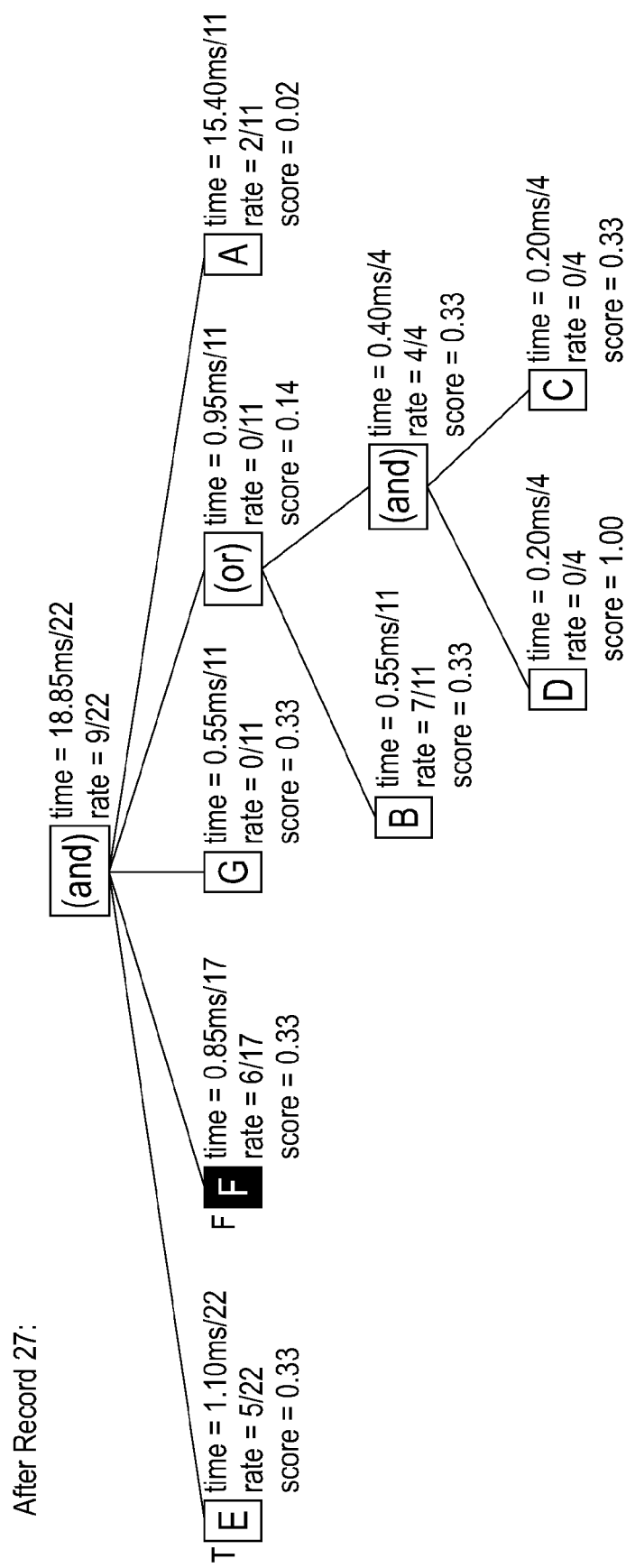
FIG. 7 is a Boolean tree for the Boolean expression of FIG. 3 summarizing the results of executing data filtering and optimization after data record 27.

After the first 6 records, the Boolean tree is optimized. Method 200 continues to run the example Boolean expression, and the Boolean tree statistical results after optimization are shown in FIG. 7. FIG. 7 summarizes the results of executing data filtering and optimization after data record 27.

FIG. 8 is a bar graph showing relative results for the example of FIGS. 3-7 without optimization and after optimization. FIG. 8 corresponds to the second column of Table 1, shown here.

TABLE 1

|  | Collecting phase (for optimizer) | Last 22 records |
|---|---|---|
| Without optimization | 9.6 ms | 34.55 ms |
| With optimization | 10.1 ms | 18.85 ms |

From FIG. 6 and FIG. 7, it can be seen that the last 22 records (records 6-27) spend 18.85 ms after optimization, while 34.55 ms are needed in the first run without optimization. Thus, 45.4% of the time is saved after the optimization. Although in the example the optimization itself added overhead (0.5 ms), the overhead is trivial by comparison to the total time required for an entire loading.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-RAY) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

It should be understood, of course, that the foregoing relates to exemplary embodiments of the invention and that modifications may be made without departing from the spirit and scope of the invention as set forth in the following claims.

We claim:

1. A computer-implemented method for use with an ETL (Extract, Transform, Load) process, comprising:
    operating a computer processor to optimize a predicate expression to select a subset of data;
    extracting the subset of data;
    filtering the subset of data;
    transforming the subset of data;
    loading the subset of data to a target;
    evaluating the predicate expression, depicted as a tree with a plurality of nodes, during the filtering of the subset of data at a time that occurs after the extracting of the subset of data, after the transforming of the subset of data, and before the loading of the subset of data to a target;
    storing, in each of the plurality of nodes, execution statistics of a plurality of child nodes of each of the plurality of nodes;
    adjusting an order of execution of the predicate expression after every n records, with n being a predetermined number of records, based on a recent execution statistic of the plurality of child nodes of the plurality of nodes and whether each of the plurality of nodes is an OR node or an AND node; and
    adjusting the order of execution of the predicate expression such that a child node of the plurality of child nodes with a lowest true rate is executed first, wherein the true rate corresponds to a percentage of time at which one of the plurality of nodes evaluates to true, wherein the execution statistics include the true rate.

2. The method of claim 1, wherein a pipelined evaluation is used to optimize a single predicate filter.

3. The method of claim 1, wherein an adaptive evaluation is used to optimize a multi-predicate filter by initially optimizing the multi-predicate filter, and then further optimizing the multi-predicate filter according to recent evaluation statistics.

4. The method of claim 1, wherein the predicate expression is a Boolean expression of filter predicates.

5. The method of claim 1, wherein:
    the predicate expression includes an attribute path having one of two types chosen from the group consisting of raw data path and dimension path.

6. The method of claim 1, wherein:
    the predicate expression includes a set level predicate having a quantifier.

7. The method of claim 1, wherein:
    the predicate expression includes either or both of a predicate for structured data and a predicate for unstructured data.

8. The method of claim 1, wherein:
    the predicate expression includes either or both of a predicate for extracted data and a predicate for transformed data.

9. The method of claim 1, wherein:
    the optimizing includes using a pipelined evaluation for a single predicate filter; and
    the pipelined evaluation terminates once either the predicate has a result for a next value matching a path of the predicate or no next value matching the path is available.

10. The method of claim 1, wherein:
    the predicate expression is a multi-predicate expression;
    the optimizing includes using an initial optimization that first executes nodes in the lowest level of a tree depicting the multi-predicate expression and then executes each next higher level in turn; and
    executes each node at each level using the optimal ordering of its child nodes.

11. An information warehouse system, the information warehouse system comprising:
    a processor for ETL (Extract, Transform, Load) processing of data, the information warehouse system configured to execute-steps for:
    extracting the data;
    filtering the data;
    transforming the data;
    loading the data to a target; and
    optimizing filtering of the data using a pipelined evaluation for single predicate filtering of a single predicate and an adaptive optimization for multiple predicate filtering of a multiple predicate wherein the multiple predicate is reordered prior to an execution of the multiple predicate filtering,
    wherein an evaluation of the single predicate and the multiple predicate filtering occurs on the data at a time that occurs during the filtering of the data by selecting a subset of the data, after extracting the data, after transforming the data, and before loading the data to a target, and wherein the adaptive optimization for multiple predicate filtering includes steps for an initial optimization of a predicate expression depicted as a tree with a number of levels of nodes, wherein the ordering of child nodes is based on a percentage of times in which the child nodes evaluate to true, and ordering the child nodes such that a child node with a lowest true rate is executed first wherein the true rate is a percentage of time for which one of the child nodes evaluates to true.

12. The information warehouse system of claim 11, wherein the adaptive optimization includes an initial phase and a dynamic phase.

13. The information warehouse system of claim 11, wherein the pipelined evaluation for single predicate filtering includes steps for:

getting a next value matching a path of the predicate, returning an evaluation result of the predicate if no next value is available; and if the predicate has a result by adding the next value to the evaluation, then returning the result, else repeating from the step of getting a next value.

14. The information warehouse system of claim 11, configured to execute steps for an initial optimization of a predicate expression depicted as a tree with a number of levels of nodes, including:

reading a number of records from the data; and iterating a loop on an index ranging from the number of levels of nodes to 2 by unit decrements, the loop including:

executing all the nodes at a level equal to the index, each node being executed using an optimal ordering of its child nodes, wherein the optimal ordering of child nodes is based on the average execution times, and successful execution times of the child nodes.

15. The information warehouse system of claim 11, including:

maintaining the most recent values of execution times and true rates for each of the nodes to update the optimal ordering of each of the nodes.

16. The information warehouse system of claim 15, wherein:

If a given execution time with respect to updating the optimal ordering of each of the nodes is small enough for all the most recent execution times to fit in a memory, all of the most recent execution times are kept in the memory; and if the given execution time is not small enough for all the most recent execution times to fit in the memory, the data are split into a number of buckets equal to the number of levels, where each bucket holds the statistics of records equal to the given execution time divided by the number of levels of nodes.

17. A computer program product for use with an ETL non-transitory computer readable medium including a computer readable program, wherein the computer readable program when executed on a computer causes the computer to:

extract data;
filter the data;
transform the data;
load the data to a target;

evaluate a predicate expression on data at a time that occurs during filtering of the data by selecting a second subset of the data, after extracting a first subset of the data, after transforming the first subset of the data, and before loading the first subset of the data to a target;

adjust an order of execution of the expression based on a change in data; and optimize the evaluation using a pipelined evaluation for a single predicate expression and an adaptive optimization for a multi-predicate expression that includes a dynamic optimization of a predicate expression depicted as a tree with multiple levels of nodes, wherein the dynamic optimization is based on:

a) whether each of the nodes is an OR node or an AND node,
b) a combination of total execute count of one of the nodes,
c) a total number of times the one of the nodes returned true, and
d) a total execution time for the one of the nodes.

18. The computer program product of claim 17, wherein the pipelined evaluation for a single predicate expression includes:

getting a next value matching a path of the predicate and, if no next value is available, returning an evaluation result of the predicate;

if the predicate has a result by including the next value in the evaluation, then returning the result; and repeating until either the predicate has a result for the next value or no next value matching the path is available.

19. The computer program product of claim 17, wherein the adaptive optimization for a multi-predicate expression includes:

an initial optimization of the predicate expression based on a user specified number of records of the data, wherein the predicate expression depicted as a tree with a number of levels of nodes, and the initial optimization includes:

executing nodes in each level of the tree beginning at a lowest level; and executing all the nodes at each level ranging from the number of levels minus one to 2, each node being executed using an optimal order of execution of its child nodes, wherein the optimal order of execution of child nodes is based on the average execution times and true rates of the child nodes, wherein child nodes with lower execution times are placed ahead of child nodes with higher execution times.

20. The computer program product of claim 17, wherein the dynamic optimization includes maintaining the most recent values of execution times and true rates for each node to update the optimal ordering of the node, wherein:

if a given execution time is small enough for all the most recent execution times and true rates to fit in a memory, all of the most recent execution times are kept in the memory; and if the execution time is not small enough, the data are split into a number of buckets, where each bucket holds the statistics of records equal to the given execution time divided by the number of levels.

* * * * *